(12) United States Patent
Xu

(10) Patent No.: US 10,295,403 B2
(45) Date of Patent: May 21, 2019

(54) DISPLAY A VIRTUAL OBJECT WITHIN AN AUGMENTED REALITY INFLUENCED BY A REAL-WORLD ENVIRONMENTAL PARAMETER

(71) Applicant: Lenovo (Beijing) Limited, Beijing (CN)

(72) Inventor: Ben Xu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/469,327

(22) Filed: Mar. 24, 2017

(65) Prior Publication Data

US 2017/0287223 A1    Oct. 5, 2017

(30) Foreign Application Priority Data

Mar. 31, 2016    (CN) .......................... 2016 1 0203119

(51) Int. Cl.
*G06T 19/00* (2011.01)
*G01J 1/42* (2006.01)
*G06T 11/00* (2006.01)
*G06T 15/00* (2011.01)

(52) U.S. Cl.
CPC .................. *G01J 1/42* (2013.01); *G06T 11/00* (2013.01); *G06T 15/00* (2013.01); *G06T 2215/16* (2013.01)

(58) Field of Classification Search
CPC .................................................... G06T 19/006

USPC ......................................................... 345/633
See application file for complete search history.

(56) References Cited

U.S. PATENT DOCUMENTS

| | | | |
|---|---|---|---|
| 2013/0044054 A1 | 2/2013 | Lee et al. | |
| 2013/0222427 A1 | 8/2013 | Heo et al. | |
| 2014/0002421 A1 | 1/2014 | Lee et al. | |
| 2014/0002492 A1* | 1/2014 | Lamb ............. | G06F 1/163 |
| | | | 345/633 |

FOREIGN PATENT DOCUMENTS

| | | |
|---|---|---|
| CN | 102735100 A | 10/2012 |
| CN | 102981810 A | 3/2013 |
| CN | 103888754 A | 6/2014 |
| CN | 104076914 A | 10/2014 |
| CN | 104977785 A | 10/2015 |

* cited by examiner

*Primary Examiner* — Jacinta M Crawford
*Assistant Examiner* — Jonathan M Cofino
(74) *Attorney, Agent, or Firm* — Kunzler Bean & Adamson

(57) ABSTRACT

A method, electronic device, and program product is disclosed. The method may include determining an environmental parameter of an environment at a location of an electronic device. The method may include identifying a first object of a virtual scenario that relates to the environmental parameter. The method may include generating a display parameter of the first object based on the environmental parameter. The method may include displaying the first object in the virtual scenario based on the display parameter.

17 Claims, 3 Drawing Sheets

DISPLAY A VIRTUAL OBJECT WITHIN AN AUGMENTED REALITY INFLUENCED BY A REAL-WORLD ENVIRONMENTAL PARAMETER

FIELD

The present application relates to the field of electronic technologies and in particular relates to an information processing method and an electronic device.

BACKGROUND

In recent years, virtual reality (VR) and augmented reality (AR) technologies have rapidly developed. Some virtual scenarios or virtual-real hybrid scenarios are created by using a virtual reality device or an augmented reality device. Sensory simulations involving vision, hearing, touch, or the like are provided for users to experience a sense of immersion. Often, the virtual scenario constructed by the AR/VR fails to vary with an environment. With respect to users, the physical world and the virtual world still seem relatively independent of each other, thereby affecting user experience.

SUMMARY

In one embodiment, a method is disclosed. The method may include determining an environmental parameter of an environment at a location of an electronic device. The method may include identifying a first object of a virtual scenario that relates to the environmental parameter. The method may include generating a display parameter of the first object based on the environmental parameter. The method may include displaying the first object in the virtual scenario based on the display parameter.

In one embodiment, an electronic device is disclosed. The electronic device may include a housing. The electronic device may include a determining unit disposed in the housing. The determining unit may be configured to determine an environmental parameter. The environmental parameter may include a parameter of the environment around the electronic device or another electronic device. The determining unit may include one or more sensors such as the sensors described above. The electronic device may include a memory and a processor disposed in the housing and connected to the memory. The memory may store code executable by the processor. The processor may include one or more processors. The executable code may, in response to being executed by the processor, determine the environmental parameter of an environment at a location of an electronic device. The executable code may, in response to being executed by the processor, identify a first object of a virtual scenario that relates to the environmental parameter. The executable code may, in response to being executed by the processor, generate a display parameter of the first object based on the environmental parameter. The executable code may, in response to being executed by the processor, display the first object in the virtual scenario based on the display parameter.

In one embodiment, a computer program product is disclosed. The program product may include a non-transitory computer readable storage medium that stores code executable by a processor. The executable code may include code to perform determining an environmental parameter of an environment where an electronic device is located. The computer program product may include code to perform identifying a first object in a virtual scenario that relates to the environmental parameter. The computer program product may include code to perform generating a display parameter of the first object based on the environmental parameter. The computer program product may include code to perform displaying the first object in the virtual scenario based on the display parameter.

BRIEF DESCRIPTION OF THE DRAWINGS

To describe the technical solutions according to the embodiments of the present invention or the technical solutions in the related art more clearly, accompanying drawings used for describing the embodiments are hereinafter briefly introduced. It is apparent that the accompanying drawings hereinafter are only intended to illustrate some embodiments of the present application.

DETAILED DESCRIPTION

Embodiments of the present application provide a method and an electronic device. The electronic device may generate a virtual scenario that may vary with the environment where an electronic device is located.

Figure 1:
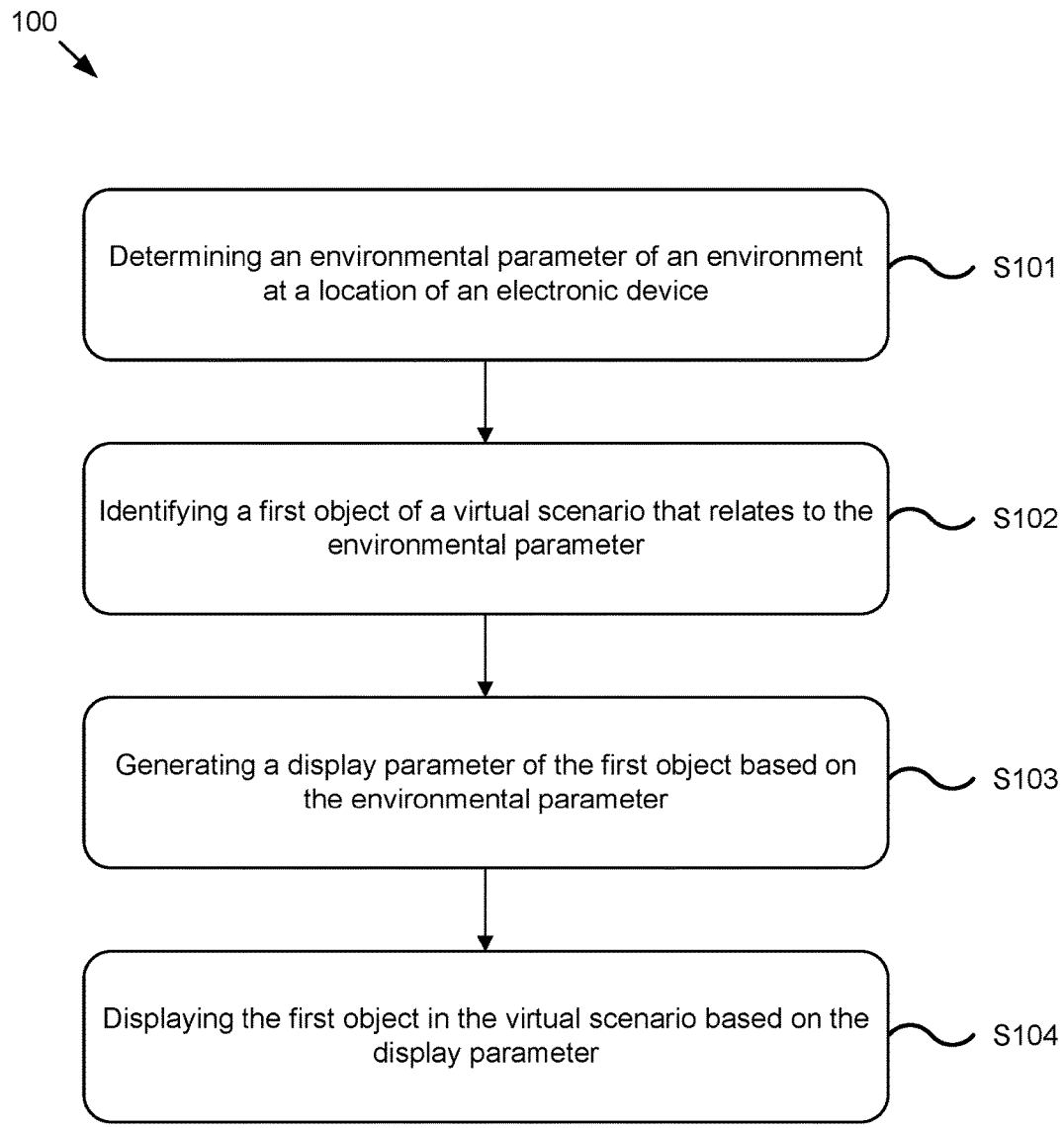
FIG. 1 is a schematic flow diagram depicting one embodiment of a method.

FIG. 1 depicts one embodiment of a method 100. The method 100 may include one or more of the following steps:

Step S101 Determining an environmental parameter of an environment at a location of an electronic device.

In one embodiment of the present application, an electronic device may include one or more sensors that may determine an environmental parameter. A sensor may include a temperature sensor, a luminance (or light) sensor, a humidity sensor, a wind force sensor, a visual sensor (such as a camera or other image or video capturing device) or the like. A sensor may collect, in real time, information regarding an environment parameter of the environment at the location of the electronic device.

In one embodiment, the electronic device that includes the one or more sensors may be a different device than the electronic device that generates and/or displays the virtual scenario. For example, in one embodiment, a server computer may generate a virtual scenario. The server may communicate data regarding the virtual scenario to a cellular phone. The phone may display the virtual scenario. The server may receive environmental parameter data from a variety of sources. For example, the server may receive environmental data from a weather service, a weather station, or the like. In one embodiment, the cell phone may determine environmental data, for example, a luminance level detected from a camera of the cell phone.

Step S102 Identifying a first object matching of a virtual scenario that relates to the environmental parameter.

In some embodiments, in response to determining the environmental parameter of the environment where the electronic device is located, the method 100 may identify a first object in a virtual scenario that relates to the environmental parameter. An object, such as the first object in a virtual scenario, relating to an environmental parameter may include the object being influenceable by the environmental parameter. The virtual scenario may include the first object. An electronic device may display the first object in the virtual scenario. A first object being influenceable by an environmental parameter may include the environmental parameter being able to change or alter the appearance, behavior, or the like of the first object in the virtual scenario. For example, in one embodiment, the first object may include a flag. Wind may influence the movement speed, direction of movement, or the like of the flag. Thus, the flag is influenceable by the wind.

In one embodiment, the virtual scenario generated by the electronic device may include a scenario generated by a virtual reality device, a scenario generated by an augmented reality device according to a reality scenario collected by a camera, microphone, or other input device. In some embodiments of the present application, the scenario generated by the electronic device may include a two-dimensional (2D) scenario, a three-dimensional (3D) scenario, or the like One of skill in the art may recognize ways that a device may receive input from reality and generate a virtual scenario or a partially virtual-partially real scenario. The term "virtual scenario," as used herein, may include any of the scenarios described above.

Step S103 Generating a display parameter of the first object based on the environmental parameter.

In one embodiment, the electronic device may generate a display parameter of the first object according to the environmental parameter of the environment where the electronic device is located. A display parameter may include instructions, data, information, or the like that the electronic device may use to generate how the first object should appear, behave, or the like, based on the determined environmental variable. For example, in one embodiment, the first object may include a flag. The environmental parameter may include the wind. The electronic device may determine that the wind is blowing at 3 meters per second (m/s) from the east. The electronic device may generate a display parameter for the flag based on that determination. The display parameter may include instructions, data, or the like that the electronic device may use to display the flag so that the flag in the virtual scenario appears to move in a west direction (since the wind is blowing from the east to the west) and that the flag's extension from its flagpole may correspond with a wind speed of 3 m/s. The display parameter may include transformation vectors or the like.

S104 Displaying the first object in the virtual scenario based on the display parameter.

In some embodiments, in response to generating the display parameter of the first object, the first object may be displayed in the virtual scenario according to the display parameter.

In one embodiment, identifying a first object that relates to the environmental parameter may include selecting the first object influenceable by the environmental parameter from at least one object in the virtual scenario. For example, in one embodiment, the virtual scenario may include multiple objects. Some objects may be influenceable by a certain environmental parameter and some may not. Identifying the first object may include determining which objects (if any) of the multiple objects may relate to the environmental parameter. For example, in one embodiment, the virtual scenario may include a flag, a track, and bleachers as objects. For example, the electronic device may iterate through the objects to determine whether an object is influenceable by wind. Each object may include a property that indicates which environmental parameters influence the object. One of skill in the art will recognize other ways to organize the objects to determine whether a certain environmental parameter may influence the objects.

In one embodiment, identifying a first object of a virtual scenario that relates to the environmental parameter may include generating a first object that is influenceable by the environmental parameter. For example, in one embodiment, a virtual scenario may not include an object influenceable by the environmental parameter. The electronic device may generate an object influenceable by the environmental parameter. The electronic device may generate the object for a variety of reasons, for example, to demonstrate how an environmental parameter of reality may influence an object in the virtual scenario.

For example, in one embodiment, the virtual scenario may include a field and bleachers. The electronic device may determine that it is raining. The electronic device may determine that the field and the bleachers of the virtual scenario are not influenced by the rain. The electronic device may generate a puddle of water and display the puddle in the virtual scenario.

In the embodiments of the present application, identifying the first object may include a variety of forms. In one embodiment, identifying the first object of a virtual scenario that relates to the environmental parameter from the at least one object may include determining, based on a first corresponding relationship between environmental parameters and objects, a first object that corresponds to the environmental parameter from the at least one object.

In one embodiment, the first corresponding relationship between the environmental parameters and the at least one object may include one or more predetermined relationships. In one embodiment, the first corresponding relationship may include one or more relationships generated over time. In response to determining the environmental parameter of the environment where the electronic device is located, the method 100 may identify the first object from multiple objects of the scenario generated by the electronic device.

For example, a virtual scenario may include a red flag on a flagpole, a track, and bleachers. The red flag may wave with the wind when the wind comes. Thus, the red flag may be influenceable by the wind environmental parameter. The virtual scenario may include a first corresponding relationship between the objects of the scenario and the wind environmental parameter. For example, the first corresponding relationship may include that the red flag is influenceable by the wind. The track, bleacher, and flagpole may not be influenceable by the wind environmental parameter. Thus, the flagpole, bleachers, and track may not be included in the first corresponding relationship.

In one embodiment, generating a first object influenceable by the environmental parameter may include determining, based on a second corresponding relationship between environmental parameters and objects, a first object corresponding to the environmental parameter, determining whether the at least one object comprises the first object, and generating the first object in response to the at least one object not comprising the first object.

In one embodiment, the second corresponding relationship between the environmental parameters and the at least one object may include a predetermined relationship. In response to determining the environmental parameter of the environment where the electronic device is located, the method 100 may include generating the first object corresponding to the environmental parameter.

For example, in one embodiment, the electronic device may be configured to detect rains in the environment where the electronic device is located. For example, the electronic device may include a humidity sensor, a light sensor, a weather sensor, a module that may receive weather data, or the like. The electronic device may generate a virtual scenario. The virtual scenario may not include rain. In one embodiment, the method 100 may establish a corresponding relationship between rain in the virtual scenario (for example, as an object) and rain in the environment of the electronic device (for example, as the environmental parameter). The virtual scenario generated by the electronic device may include a playing field, and objects in the scenario may include a track, a flagpole, and bleachers. In response to the electronic device detecting rain in the environment where the electronic device is located, the electronic device may determine whether there is rain in the virtual scenario. In response to determining that there is no rain in the virtual scenario, the electronic device may generate and add rain to the virtual scenario.

In some embodiments, generating the display parameter of the first object may include a variety of forms. In one embodiment, an environmental parameter may include a wind force of the environment where the electronic device is located. Generating the display parameter of the first object based on the environmental parameter may include calculating a display movement direction and a display movement speed of the first object based on the wind force parameter. In one embodiment, the wind force parameter may indicate a wind direction and a wind force value of the environment where the electronic device is located. The display movement direction and display movement speed may be included in the display parameter.

In one embodiment, displaying the first object in the virtual scenario based on the display parameter may include dynamically displaying the first object in the virtual scenario based on the display movement speed in the display movement direction.

In some embodiments, the method 100 may display the first object in the virtual scenario based on the display parameter. For example, in one embodiment, the wind may blow from the east at a speed of 3 m/s. A flag on a flagpole may wave to the west at a speed of 1 m/s. The method may establish a corresponding relationship between wind forces and movement distances and a corresponding relationship between wind directions and movement directions. In response to detecting that the wind blows from the east at a speed of 3 m/s, the flag corners of the red flag in the virtual scenario may wave to the west at a speed of 1 m/s.

In response to the environmental parameter including a luminance of the environment where the electronic device is located, generating a display parameter of the first object based on the environmental parameter may include calculating a display luminance of the first object based on the luminance. Displaying the first object in the virtual scenario based on the display parameter may include displaying the first object in the virtual scenario based on the display luminance.

In one embodiment, the method 100 may include determining the luminance of the first object based on the luminance of the environment where the electronic device is located. In response to the luminance of the environment increasing, the method 100 may generate a display parameter for the first object based on that increased luminance.

In one embodiment, the method 100 may establish a corresponding relationship between the luminance of the environment of the electronic device and the luminance of the first object. For example, the virtual scenario may include a study room. The first object may include a desk. The environment may include a first luminance. In response to the luminance of the environment increasing from the first luminance to a second luminance, the electronic device may detect the second luminance. The method 100 may establish a corresponding relationship between the luminance of the environment and the luminance of the first object in the virtual scenario. In response, the method 100 may generate a display parameter for the desk based on the second luminance and adjust the luminance of the desk in the virtual scenario to the second luminance by displaying the desk based on the display parameter.

In one embodiment, in response to the environmental parameter including a depth of field of the environment where the electronic device is located, generating the display parameter may include calculating a display size of the first object based on the depth of field. Displaying the first object in the virtual scenario based on the display parameter may include displaying the first object in the virtual scenario based on the display size. The display parameter may include the display size.

In some embodiments, in response to identifying the first object, the method 100 may calculating a display size of the first object based on the depth of field of the environment where the electronic device is located. For example, the electronic device may generate a virtual scenario based on a selected image of a tree. In response to the temperature of the environment of the electronic device rising to a predetermined temperature, the electronic device may generate a bird on the tree. In response to the tree being far away from the electronic device, the depth of field of the generated bird is great such that the bird is displayed in the virtual scenario on the tree and may appear small in size. In response to the tree being near to the electronic device, the tree in virtual scenario may be in a place with a small depth of field. In this case, the depth of field of the generated bird may be small, and correspondingly, the bird may appear on the tree with a larger size.

In one embodiment, the Step S101 (determining the environmental parameter of the environment at the location of the electronic device) may include receiving the environmental parameter from a sensor of the electronic device. The sensor may include a wind force sensor, a luminance sensor, a depth of field sensor, or the like.

By using the method 100, in response to the user using the electronic device, the virtual scenario generated by the electronic device may vary with the changes of the environment where the user is located. In this way, the virtual scenario appears closer to reality and user experience is greatly improved.

Figure 2:
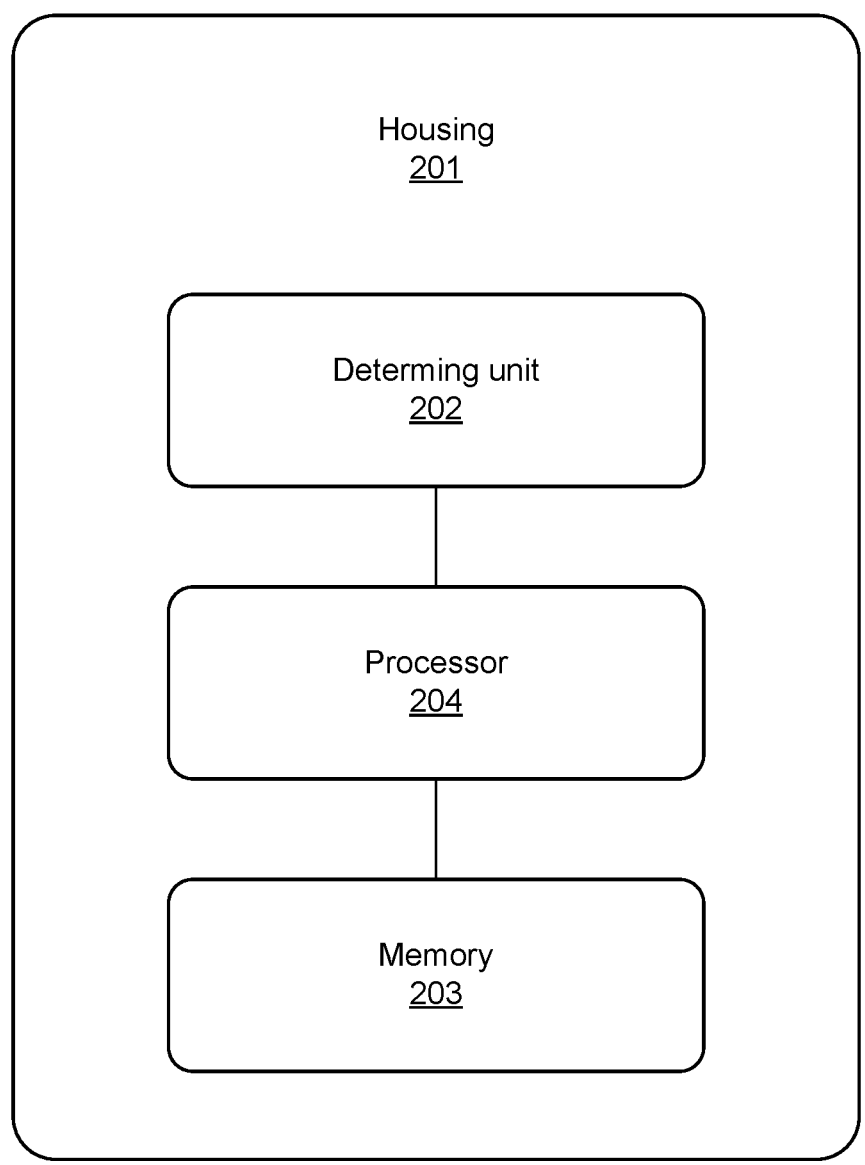
FIG. 2 is a schematic block diagram depicting one embodiment of an electronic device.

FIG. 2 depicts one embodiment of an electronic device 200. The electronic device 200 may include a housing 201. The electronic device may include a determining unit 202 disposed in the housing 201. The determining unit 202 may be configured to determine an environmental parameter. The environmental parameter may include a parameter of the environment around the electronic device 200 or another electronic device. The determining unit may include one or more sensors such as the sensors described above. The electronic device 200 may include a memory 203 and a processor 204 disposed in the housing 201 and connected to the memory 203. The memory 203 may store code executable by the processor 204. The processor 204 may include one or more processors. The executable code may, in response to being executed by the processor 204, determine the environmental parameter of an environment at a location of an electronic device. The executable code may, in response to being executed by the processor 204, identify a first object of a virtual scenario that relates to the environmental parameter. The executable code may, in response to being executed by the processor 204, generate a display parameter of the first object based on the environmental parameter. The executable code may, in response to being executed by the processor 204, display the first object in the virtual scenario based on the display parameter.

In one embodiment, the executable code may further include code to select the first object influenceable by the environmental parameter from at least one object of the virtual scenario. The executable code may further include code to generate the first object influenceable by the environmental parameter.

In some embodiments, the executable code may further include code to determine, based on a first corresponding relationship between environmental parameters and objects, an object that corresponds to the environmental parameter.

In one embodiment, the executable code may further include code to determine, based on a second corresponding relationship between environmental parameters and objects, an object corresponding to the environmental parameter. The code may include code to determine whether the at least one object includes the first object. The code may include code to generate the first object in response to the at least one object not including the first object.

In one embodiment, the executable code to generate the display parameter of the first object based on the environmental parameter may include, in response to the environmental parameter including a wind force of the environment where the electronic device is located, code to calculate a display movement direction and/or a display movement speed of the first object based on the wind force. The wind force may indicate a wind direction and/or a wind force value of the environment where the electronic device is located.

In one embodiment, the executable code to generate the display parameter of the first object based on the environmental parameter may include, in response to the environmental parameter including a luminance of the environment where the electronic device is located, code to calculate a display luminance of the first object based on the luminance. The luminance parameter may include a light level, luminance, or the like of the environmental where the electronic device is located.

In one embodiment, the executable code to generate the display parameter of the first object based on the environmental parameter may include, in response to the environmental parameter including a depth of field of the environment where the electronic device is located, code to calculate a display size of the first object based on the depth of field of the environment.

In one embodiment, the code to display the first object in the virtual scenario based on the display parameter may include code to dynamically display the first object based on the display movement speed or display movement direction of the wind parameter, display the first object based on the display luminance, or display the first object based on the display size.

In one embodiment, the determining unit 202 may include a sensor. The sensor may include a wind force sensor, a luminance sensor, a depth of field sensor, or the like.

Figure 3:
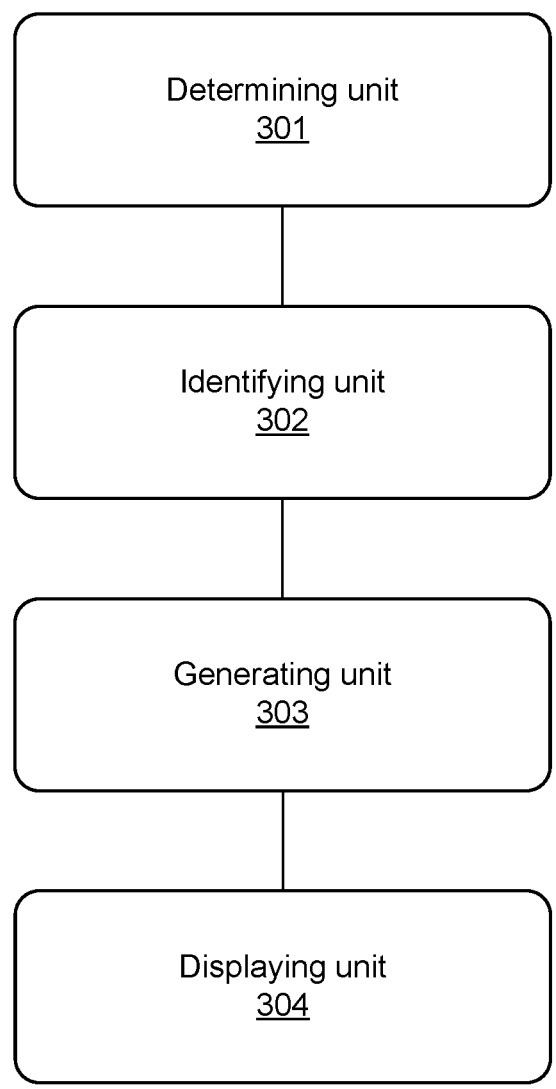
FIG. 3 is a schematic block diagram of another embodiment of an electronic device.

FIG. 3 depicts one embodiment of an electronic device 300. In one embodiment, the electronic device 300 may include a determining unit 301 configured to determine an environmental parameter of an environment where an electronic device is located, an identifying unit 302 configured to identify a first object in a virtual scenario that relates to the environmental parameter, a generating unit 303 configured to generate a display parameter of the first object based on the environmental parameter, and a displaying unit 304 configured to display the first object in the virtual scenario based on the display parameter.

In one embodiment, the electronic device 300, the determining unit 301, the identifying unit 302, generating unit 303, and/or displaying unit 304 may include functionality, behavior, components, or the like described herein. The various units of the electronic device 300 may execute one or more steps of the method 100. The units may include executable code as described herein that may carry out various functions. The units may include hardware, software, or a combination of both. For example, the determining unit 301 may include one or more sensors as described above. The identifying unit 302 and/or generating unit 303 may include a memory and a processor. The displaying unit 304 may include a display screen or the like. One of skill in the art will recognize other forms the units may include.

In one embodiment, computer program instructions may be provided to a general computer, a dedicated computer, an embedded processor, or one or more processors of another programmable data processing device to generate a machine. The machine may enable the computer or the processors of other programmable data processing devices to run the instructions to implement an apparatus for implementing specific functions in at least one process in the flow diagrams and/or at least one block in the block diagrams.

In one embodiment, the computer program instructions may be stored in a computer-readable memory capable of causing a computer or other programmable data processing devices to work in a specific mode. The instructions stored in the computer-readable memory may generate a product comprising an instruction apparatus. The instruction apparatus may implement specific functions in at least one process in the flow diagrams and/or at least one block in the block diagrams.

The computer program instructions, in one embodiment, may be loaded on a computer or other programmable data processing devices. The computer or the other programmable data processing devices may run a series of operations or steps to implement processing of the computer. The instructions, in response to being run on the computer or the other programmable data processing devices, may implement the specific functions in at least one process in the flow diagrams and/or at least one block in the block diagrams.

In certain embodiments, the computer program instructions may correspond to the information processing methods according to the embodiments of the present application. The instructions may be stored in storage medium such as an optical disk, a hard disk, a U disk, or the like. The computer program instructions corresponding to the information processing methods stored in the storage medium, in response to being read or run by an electronic device, may cause the electronic device to perform one or more the following steps.

In one embodiment, the computer program product may include code to perform determining an environmental parameter of an environment where an electronic device is located. In one embodiment, the computer program product may include code to perform identifying a first object in a virtual scenario that relates to the environmental parameter. The computer program product may include code to perform generating a display parameter of the first object based on the environmental parameter. The computer program product may include code to perform displaying the first object in the virtual scenario based on the display parameter.

In one embodiment, in response to the code performing the step of identifying the first object that relates to the environmental parameter, the program product may include code to perform selecting the first object in the virtual scenario that is influenceable by the environmental parameter from at least one object in the virtual scenario, or generating the first object in the virtual scenario that is influenceable by the environmental parameter.

In some embodiments, the code to perform selecting the first object that is influenceable by the environmental parameter from the at least one objects may include code to perform determining, based on a first corresponding relationship between environmental parameters and objects, that the first object corresponds to the environmental parameter.

In one embodiment, the code to perform generating the first object that is influenceable by the environmental parameter may include code to perform determining, based on a second corresponding relationship between environmental parameters and objects, that the first object corresponds to the environmental parameter. The code may perform determining whether the at least one objects includes the first object. The code may include code that performs generating the first object in response to the at least one object not including the first object.

In some embodiments, generating the display parameter of the first object based on the environmental parameter may include code to perform one or more of the following.

The code may include code to perform, in response to the environmental parameter including is a wind force of the environment where the electronic device is located, calculating a display movement direction and a display movement speed of the first object based on the wind force. The code may include code to perform, in response to the environmental parameter including a luminance of the environment where the electronic device is located, calculating a display luminance of the first object based on the luminance. The code may include code to perform, in response to the environmental parameter including a depth of field of the environment where the electronic device is located, calculating a display size of the first object based on the depth of field.

In one embodiment, code to perform displaying the first object in the virtual scenario based on the display parameter may include code to perform dynamically displaying the first object in the virtual scenario based on the display movement speed in the display movement direction, displaying the first object in the virtual scenario based on the display luminance, or displaying the first object in the virtual scenario based on the display size. In one embodiment, the code to perform determining an environmental parameter of an environment at a location of an electronic device may include code to receive the environmental parameter from a sensor. The sensor may include a wind force sensor, a luminance sensor, a depth of field sensor, or the like.

Those skilled in the art will understand that the embodiments may be described as illustrating methods, systems, or computer program products. Therefore, hardware embodiments, software embodiments, or a combination of hardware and software embodiments may be used to illustrate the present disclosure. In addition, the present disclosure may further employ a computer program product, which may be implemented by at least one non-transitory computer-readable storage medium with runnable program code stored thereon. The non-transitory computer-readable storage medium may include, but is not limited to a disk memory, a CD-ROM, an optical memory, or the like.

The present application may be described based on the flow diagrams and/or block diagrams of the method, device, system, or computer program product. It should be understood that each process and/or block in the flow diagrams and/or block diagrams, or a combination of the processes and/or blocks in the flow diagrams and/or block diagrams may be implemented using computer program instructions.

Although some embodiments of the present disclosure are described, those skilled in the art may make modifications and variations to these embodiments based on the basic inventive concept of the present disclosure. Therefore, the described embodiments and other modifications and variations may fall within the protection scope subject to the appended claims.

It is apparent that a person skilled in the art may make various modifications and variations to the present disclosure without departing from the spirit and scope of the present disclosure. Such modifications and variations fall within the scope defined by the claims of the present disclosure and equivalent technologies thereof. The present disclosure is intended to cover such modifications and variations.

What is claimed is:

1. A method comprising:
   determining a real-world environmental parameter in a real-world environment at a real-world location of an electronic device;
   identifying a first virtual object of a virtual scenario that corresponds to a real-world object;
   attributing the real-world environmental parameter to the virtual scenario;
   generating a display parameter of the first virtual object; and
   displaying the first virtual object in the virtual scenario with the display parameter,
   wherein:
      the first virtual object is selected from among a set of virtual objects within the virtual scenario based on the first virtual object including one or more first characteristics corresponding to one or more second characteristics of the real-world object that are influenceable by the real-world environmental parameter, and
      the display parameter includes the one or more first characteristics of the first virtual object responding to the real-world environmental parameter influencing the first virtual object in the virtual scenario in a manner corresponding to the one or more second characteristics of the real-world object being influenced by and responding to the real-world environmental parameter.

2. The method of claim 1, wherein selecting the first virtual object comprises:
   determining, based on a first corresponding relationship between environmental parameters and objects, that the one or more first characteristics of the first virtual object correspond to the one or more second characteristics of the real-world object that are influenceable by the real-world environmental parameter.

3. The method of claim 2, wherein generating the first virtual object comprises:
   determining, based on a second corresponding relationship between environmental parameters and objects, that the one or more first characteristics of the first virtual object are influenceable by the real-world environmental parameter;
   determining whether the virtual scenario comprises the first virtual object; and
   generating the first virtual object within the virtual scenario with the one or more first characteristics that are influenceable by the real-world environmental parameter in response to the virtual scenario not comprising the first virtual object.

4. The method of claim 1, wherein generating the display parameter comprises at least one of:
in response to the real-world environmental parameter comprising a wind force of the real-world environment where the electronic device is located, calculating a display movement direction and a display movement speed of the first virtual object based on the wind force and influencing the one or more first characteristics of first virtual object based on the calculated display movement and display movement speed;
in response to the real-world environmental parameter comprising a luminance of the real-world environment where the electronic device is located, calculating a display luminance of the first virtual object based on the luminance and influencing the one or more first characteristics of first virtual object based on the calculated luminance; and
in response to the real-world environmental parameter comprising a depth of field of the real-world environment where the electronic device is located, calculating a display size of the first virtual object based on the depth of field and influencing the one or more first characteristics of first virtual object based on the calculated display size.

5. The method of claim 4, wherein displaying the first virtual object comprises at least one of:
dynamically displaying the first virtual object in the virtual scenario with the one or more characteristics being influenced by the wind force and based on the display movement speed in the display movement direction;
displaying the first virtual object in the virtual scenario with the one or more characteristics being influenced by the luminance and based on the display luminance; and
displaying the first virtual object in the virtual scenario with the one or more characteristics being influenced by the depth of field and based on the display size.

6. The method of claim 1, wherein determining the real-world environmental parameter comprises:
receiving the real-world environmental parameter from a sensor of the electronic device,
wherein the sensor comprises at least one of:
a wind force sensor;
a luminance sensor; and
a depth of field sensor.

7. An electronic device, comprising:
a housing;
a sensor disposed in the housing and configured to detect a real-world environmental parameter of a real-world environment at a real-world location of the electronic device;
at least one processor; and
a memory that stores code executable by the at least one processor to:
identify a first virtual object of a virtual scenario that corresponds to a real-world object;
attribute the real-world environmental parameter to the virtual scenario;
generate a display parameter of the first virtual object; and
display the first virtual object in the virtual scenario with the display parameter,
wherein:
the first virtual object is selected from among a set of virtual objects within the virtual scenario based on the first virtual object including one or more first characteristics corresponding to one or more second characteristics of the real-world object that are influenceable by the real-world environmental parameter, and
the display parameter includes the one or more first characteristics of the first virtual object responding to the real-world environmental parameter influencing the first virtual object in the virtual scenario in a manner corresponding to the one or more second characteristics of the real-world object being influenced by and responding to the real-world environmental parameter.

8. The electronic device of claim 7, wherein the memory that stores code executable by the processor to select the first virtual object comprises code to determine, based on a first corresponding relationship between environmental parameters and objects, that the one or more first characteristics of the first virtual object correspond to the one or more second characteristics of the real-world object that are influenceable by the real-world environmental parameter.

9. The electronic device of claim 8, wherein the memory that stores code executable by the processor to generate the first virtual object comprises code to:
determine, based on a second corresponding relationship between environmental parameters and objects, that the one or more first characteristics of the first virtual object are influenceable by the real-world environmental parameter;
determine whether the virtual scenario comprises the first virtual object; and
generate the first virtual object within the virtual scenario with the one or more first characteristics that are influenceable by the real-world environmental parameter in response to the virtual scenario not comprising the first virtual object.

10. The electronic device of claim 7, wherein the memory that stores code executable by the processor to generate the display parameter comprises code to at least one of:
in response to the real-world environmental parameter comprising a wind force of the real-world environment where the electronic device is located, calculate a display movement direction and a display movement speed of the first virtual object based on the wind force and influence the one or more first characteristics of first virtual object based on the calculated display movement and display movement speed;
in response to the real-world environmental parameter comprising a luminance of the real-world environment where the electronic device is located, calculate a display luminance of the first virtual object based on the luminance and influence the one or more first characteristics of first virtual object based on the calculated luminance; and
in response to the real-world environmental parameter comprising a depth of field of the real-world environment where the electronic device is located, calculate a display size of the first object based on the depth of field and influence the one or more first characteristics of first virtual object based on the calculated display size.

11. The electronic device of claim 10, wherein the memory that stores code executable by the processor to display the first virtual object comprises code to at least one of:

dynamically display the first virtual object in the virtual scenario with the one or more characteristics being influenced by the wind force and based on the display movement speed in the display movement direction;

display the first virtual object in the virtual scenario with the one or more characteristics being influenced by the luminance and based on the display luminance; and display the first virtual object in the virtual scenario with the one or more characteristics being influenced by the depth of field and based on the display size.

12. The electronic device of claim 7, wherein the sensor comprises at least one of:
a wind force sensor;
a luminance sensor; and
a depth of field sensor.

13. A program product comprising a non-transitory computer readable storage medium that stores code executable by a processor, the executable code comprising code to perform:
determining a real-world environmental parameter in a real-world environment at a real-world location of an electronic device;
identifying a first virtual object of a virtual scenario that corresponds to a real-world object;
attributing the real-world environmental parameter to the virtual scenario;
generating a display parameter of the first virtual object; and
displaying the first virtual object in the virtual scenario with the display parameter
wherein:
the first virtual object is selected from among a set of virtual objects within the virtual scenario based on the first virtual object including one or more first characteristics corresponding to one or more second characteristics of the real-world object that are influenceable by the real-world environmental parameter, and
the display parameter includes the one or more first characteristics of the first virtual object responding to the real-world environmental parameter influencing the first virtual object in the virtual scenario in a manner corresponding to the one or more second characteristics of the real-world object being influenced by and responding to the real-world environmental parameter.

14. The program product of claim 13, further comprising code to perform at least one of:
determining, based on a first corresponding relationship between environmental parameters and objects, that the one or more first characteristics of the first virtual object correspond to the one or more second characteristics of the real-world object that are influenceable by the real-world environmental parameter;
determining, based on a second corresponding relationship between environmental parameters and objects, that the one or more first characteristics of the first virtual object are influenceable by the real-world environmental parameter;
determining whether the virtual scenario comprises the first virtual object; and
generating the first virtual object within the virtual scenario with the one or more first characteristics that are influenceable by the real-world environmental parameter in response to the virtual scenario not comprising the first virtual object.

15. The program product of claim 13, further comprising code to perform at least one of:
in response to the real-world environmental parameter comprising a wind force of the real-world environment where the electronic device is located, calculating a display movement direction and a display movement speed of the first virtual object based on the wind force and influencing the one or more first characteristics of first virtual object based on the calculated display movement and display movement speed;
in response to the real-world environmental parameter comprising a luminance of the real-world environment where the electronic device is located, calculating a display luminance of the first virtual object based on the luminance and influencing the one or more first characteristics of first virtual object based on the calculated luminance; and
in response to the real-world environmental parameter comprising a depth of field of the real-world environment where the electronic device is located, calculating a display size of the first object based on the depth of field and influencing the one or more first characteristics of first virtual object based on the calculated display size.

16. The program product of claim 15, further comprising code to at least one of:
dynamically displaying the first virtual object in the virtual scenario with the one or more characteristics being influenced by the wind force and based on the display movement speed in the display movement direction;
displaying the first virtual object in the virtual scenario with the one or more characteristics being influenced by the luminance and based on the display luminance; and
displaying the first virtual object in the virtual scenario with the one or more characteristics being influenced by the depth of field and based on the display size.

17. The program product of claim 13, wherein the code to perform determining the real-world environmental parameter comprises code to:
receive the real-world environmental parameter from a sensor,
wherein the sensor comprises at least one of:
a wind force sensor;
a luminance sensor; and
a depth of field sensor.

* * * * *